(12) United States Patent
Zarrabi

(10) Patent No.: US 12,191,794 B2
(45) Date of Patent: Jan. 7, 2025

(54) AXLE GENERATOR

(71) Applicant: Carrier Corporation, Palm Beach Gardens, FL (US)

(72) Inventor: Jamal Zarrabi, Les Andelys (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 189 days.

(21) Appl. No.: 17/716,044

(22) Filed: Apr. 8, 2022

(65) Prior Publication Data

US 2022/0329183 A1 Oct. 13, 2022

(30) Foreign Application Priority Data

Apr. 9, 2021 (EP) .................................. 21167687

(51) Int. Cl.
*H02P 9/06* (2006.01)
*B60L 1/00* (2006.01)
(Continued)

(52) U.S. Cl.
CPC .................. *H02P 9/06* (2013.01); *B60L 1/00* (2013.01); *B60R 16/033* (2013.01); *F16D 48/06* (2013.01);
(Continued)

(58) Field of Classification Search
CPC .......... H02P 9/06; H02P 9/00; H02P 2101/45; B60L 1/00; B60R 16/033; F16D 48/06;
(Continued)

(56) References Cited

U.S. PATENT DOCUMENTS

| 1,766,163 | A | * | 6/1930 | Vukosav | ............... H02J 7/1415 318/1 |
| 4,072,888 | A | | 2/1978 | Bechtle et al. | |

(Continued)

FOREIGN PATENT DOCUMENTS

| JP | 2009214587 A | * | 9/2009 | |
| JP | 2010202169 A | * | 9/2010 | ............. Y02T 10/62 |

(Continued)

OTHER PUBLICATIONS

Translation of JP-214587-A, 9 pages. (Year: 2009).*
(Continued)

*Primary Examiner* — Dale W Hilgendorf
(74) *Attorney, Agent, or Firm* — CANTOR COLBURN LLP

(57) ABSTRACT

A generator system for connection to a vehicle axle. The generator system includes: an electrically-actuated clutch having an engaged position and a disengaged position; a generator and a processor. The generator includes: a rotor configured to be selectively connected, via the clutch, to the vehicle axle; and a stator. In the engaged position, the rotor is connected to the vehicle axle via the clutch such that torque from the vehicle axle is transmitted to the rotor. In the disengaged position, torque from the vehicle axle is not transmitted to the rotor. The processor is configured to control the clutch to actuate between the engaged and disengaged positions, and the processor is configured to monitor an electrical output of the generator, wherein the processor is configured to command the clutch to move to the disengaged position if the electrical output moves outside a predetermined range.

15 Claims, 3 Drawing Sheets

(51) Int. Cl.

| | |
|---|---|
| *B60P 3/20* | (2006.01) |
| *B60R 16/033* | (2006.01) |
| *F16D 48/06* | (2006.01) |
| *H02K 7/108* | (2006.01) |
| *H02K 7/18* | (2006.01) |
| *H02P 9/00* | (2006.01) |
| *H02P 101/45* | (2016.01) |

(52) U.S. Cl.
CPC ........... *H02K 7/108* (2013.01); *H02K 7/1861* (2013.01); *H02P 9/00* (2013.01); *B60P 3/20* (2013.01); *F16D 2500/1021* (2013.01); *F16D 2500/30415* (2013.01); *H02P 2101/45* (2015.01)

(58) Field of Classification Search
CPC .. F16D 2500/1021; F16D 2500/30415; H02K 7/108; H02K 7/1861; B60P 3/20
See application file for complete search history.

(56) References Cited

U.S. PATENT DOCUMENTS

| | | | | |
|---|---|---|---|---|
| 4,134,272 | A | | 1/1979 | Reimann |
| 5,265,435 | A | * | 11/1993 | Richardson .......... B60H 1/3225 62/133 |
| 6,425,838 | B1 | | 7/2002 | Matsubara et al. |
| 7,259,469 | B2 | * | 8/2007 | Brummett ............ B60H 1/3226 290/40 C |
| 7,497,285 | B1 | * | 3/2009 | Radev ...................... B60K 6/52 180/65.23 |
| 8,167,752 | B2 | | 5/2012 | Houle |
| 8,347,999 | B2 | * | 1/2013 | Koelsch ................. B60L 8/003 180/165 |
| 8,723,344 | B1 | * | 5/2014 | Dierickx ................ B60K 25/08 290/1 R |
| 8,776,928 | B2 | * | 7/2014 | Stover, Jr. ................. B60P 3/20 180/165 |
| 8,825,242 | B2 | | 9/2014 | Foster |
| 9,464,839 | B2 | | 10/2016 | Rusignuolo et al. |
| 9,707,844 | B2 | | 7/2017 | Arnold et al. |
| 10,239,534 | B2 | * | 3/2019 | Amigo ...................... B60L 7/10 |
| 10,787,089 | B1 | | 9/2020 | Macaluso |
| 11,485,228 | B1 | * | 11/2022 | Smith ..................... B60K 6/387 |
| 2007/0187957 | A1 | * | 8/2007 | Harrison ................. B60L 8/00 290/1 R |
| 2007/0272116 | A1 | | 11/2007 | Bartley et al. |
| 2008/0174174 | A1 | * | 7/2008 | Burns ...................... B60L 7/14 303/152 |
| 2012/0319472 | A1 | * | 12/2012 | Arnold ............... B60H 1/00428 307/9.1 |
| 2018/0264951 | A1 | * | 9/2018 | Kooi ....................... B60K 1/00 |
| 2019/0143516 | A1 | | 5/2019 | Wong et al. |
| 2020/0391574 | A1 | * | 12/2020 | Ducher ................ B60H 1/3232 |
| 2021/0162855 | A1 | * | 6/2021 | Kumar ................. B60W 10/14 |
| 2021/0206261 | A1 | * | 7/2021 | Renault ............... B60H 1/3226 |
| 2022/0314738 | A1 | * | 10/2022 | Beaufrere ............. B60K 25/08 |
| 2023/0078149 | A1 | * | 3/2023 | Van Wijk ........... B60H 1/00428 701/36 |

FOREIGN PATENT DOCUMENTS

| | | |
|---|---|---|
| WO | 2012045056 A2 | 4/2012 |
| WO | 2019219997 A1 | 11/2019 |
| WO | 2019229490 A1 | 12/2019 |
| WO | 2020117467 A1 | 6/2020 |

OTHER PUBLICATIONS

Translation of JP-2010202169-A, 11 pages (Year: 2010).*
European Search Report for Application No. 21167687.9; Issued Sep. 29, 2021; 7 Pages.
EP Communication for Application No. 21167687.9, Issued Oct. 28, 2024, 4 Pages.

* cited by examiner

AXLE GENERATOR

FOREIGN PRIORITY

This application claims priority to European Patent Application No. 21167687.9, filed Apr. 9, 2021, and all the benefits accruing therefrom under 35 U.S.C. § 119, the contents of which in its entirety are herein incorporated by reference.

TECHNICAL FIELD OF INVENTION

The present disclosure relates to a generator system for connection to a vehicle axle, and to a method of controlling a generator system.

BACKGROUND OF THE INVENTION

Trailers are a type of wheeled road vehicle that are pulled by another vehicle such as a tractor, as trailers do not have an engine for powering their own wheels for rotation. Trailers are common in the transportation industry, where the trailer is used to contain cargo, and a trailer may be connected to and disconnected from different tractors (also called trucks, lorry cars, or truck cars). The driver sits in the tractor and the tractor engine provides the motive power to pull the trailer to its destination.

Some trailers contain powered components, such as lights and/or refrigeration systems. The refrigeration system may be for cooling the cargo hold of the trailer, e.g. to preserve perishable goods such as foodstuffs or medicine. In some examples, the trailer receives all necessary electrical power from the tractor. That is, when the trailer is mounted to a given tractor, an electrical connection is also provided to provide power from the tractor battery or a generator in the tractor, to the trailer.

It is also known to provide a generator having a rotor connected to an axle of the trailer, such that, when the trailer is pulled by a tractor, the trailer wheels are driven to rotate and this rotation is passed, via the axle, to the rotor of a generator mounted on the trailer. The generator generates electrical power for use by the trailer.

Such conventional generators have generally been considered satisfactory for their intended purpose but there is room for improvement.

SUMMARY OF THE INVENTION

According to a first aspect, there is provided a generator system for connection to a vehicle axle. The generator system comprises: an electrically-actuated clutch having an engaged position and a disengaged position; a generator comprising: a rotor configured to be selectively connected, via the clutch, to the vehicle axle; and a stator; wherein, in the engaged position, the rotor is connected to the vehicle axle via the clutch such that torque from rotation of the vehicle axle is transmitted to the rotor, and wherein, in the disengaged position, torque from rotation of the vehicle axle is not transmitted to the rotor. A processor is provided and is configured to control the clutch to actuate between the engaged and disengaged positions; wherein the processor is configured to monitor an electrical output of the generator, wherein the processor is configured to command the clutch to move to the disengaged position if the electrical output moves outside a predetermined range.

The electrical output may be one or more of electrical voltage, electrical current, or electrical frequency.

The predetermined range may be an electrical frequency range of from 0 Hz to 500 Hz; and/or the predetermined range may be an electrical voltage range of from 0 volts to 600 volts; and/or the predetermined range may be an electrical current range of from 0 amps to 32 amps.

500 Hz output may correspond to a maximum safe operational speed for the rotor, and so disconnecting the rotor if the output exceeds 500 Hz may protect the generator. This may also protect any connected electronic components that are frequency sensitive.

600 V may be a maximum rated output of the generator, and so disconnecting the rotor if the output exceeds 600 V may protect the generator and/or any connected electronic components.

32 amps may be a maximum rated output of the generator, and so disconnecting the rotor if the output exceeds 32 amps may protect the generator and/or any connected electronic components.

Different generators may have a different maximum frequency output and/or different voltage output, and so the aforesaid maximum values of 500 Hz and/or 600 V and/or 32 A may be reduced by configuring the processor as appropriate (e.g. the desired values for when the processor commands the clutch to disconnect may be set by software running on the processor).

Optionally, the minimum of the predetermined range may be 10 Hz or 10 V or 1 A. In these cases, the processor may command the clutch to the disengaged position when the power output is non-zero but is insufficient for the necessary purposes. Necessary purposes may include powering a refrigeration system and/or charging a battery.

Similarly, a different minimum voltage or frequency or current may be set e.g. by software.

The generator system may further comprise a sensor for detecting a rotational speed or frequency of the vehicle axle; wherein the sensor is connected to the processor, and wherein the processor is configured to: convert the detected rotational speed or frequency of the axle into an expected electrical output generated by the generator; determine a locked-state of the rotor if the monitored electrical output differs from the expected electrical output by more than a predetermined amount; and to control the clutch to move to the disengaged position in response to determining a locked-state of the rotor.

The expected electrical output may be an expected electrical frequency, or an expected electrical voltage, or an expected electrical current, as desired.

This may help protect a vehicle against unintended braking of the wheel(s) when the rotor is jammed (locked) within the generator. The predetermined amount allows for measurement errors in one or both of the sensed rotational speed and the detected electrical output of the generator. This helps avoid disconnecting the generator unnecessarily when everything is operating normally but a measurement error indicates a small discrepancy between the expected frequency and the detected frequency.

The processor may be further configured to: determine an overspeed state if the detected rotational speed or frequency of the axle is above a predetermined speed or frequency; and control the clutch to move to the disengaged position in response to determining an overspeed state.

This may protect the generator from being driven too fast, beyond its design parameters. This may also avoid letting the generator output too much power which could damage electronic components that are powered using the generator.

The generator system may further comprise a battery, wherein the battery is configured to supply electrical power to the electrically-actuated clutch and to the processor; and wherein the generator is configured to selectively provide power to the battery to charge the battery.

The battery may provide the power to engage/disengage the clutch to allow the generator system to be self-starting, i.e. in the case where the clutch is disengaged, the generator system has its own power to engage the clutch and thereby generate power from the generator.

The processor may be configured to detect a battery charge level and to control the clutch to move to the disengaged position in response to determining that the battery charge level is above a predetermined level.

In the case where the battery has low charge, it may be desirable to charge the battery using the generator, even if there is no other need for the generator power (e.g. if a refrigeration system is off etc.)

According to a second aspect, a trailer is provided, the trailer comprising: a wheel; an axle connected to the wheel; and the generator system of the first aspect. The rotor is selectively connected to the axle via the clutch; and wherein the axle is arranged to be driven in rotation by relative motion between the trailer and a surface the trailer is on.

The generator system may be used to provide electrical power to the trailer, e.g. to power lights or power a refrigeration system of the trailer. This can reduce or eliminate the need for electrical power to be provided to the trailer by a tractor pulling the trailer.

It is known that rotors may jam within a generator, for example due to friction between components of the generator. In known systems where the generator is permanently connected to the axle, this provides a braking force on the axle and thus on the trailer wheel(s). This can cause a safety risk from the wheels slipping against the road surface. Further, applying heavy torque from the wheels to a jammed rotor may damage the generator. Thus, being able to disconnect the generator from axle can improve safety for the trailer and improve the lifetime of the generator.

Additionally or alternatively, if the trailer is in motion but no electrical power is currently required from the generator, then the clutch may be disengaged to prevent the rotor unnecessarily spinning in the generator, thus reducing unnecessary wear on the generator components. Thus, being able to disconnect the generator from axle can improve the lifetime of the generator for this reason too.

The trailer may not have an engine for driving the axle. That is, the trailer may rely entirely upon a tractor to move the trailer from place to place. In this case, the generator system is connected to an axle that is freewheeling, i.e. not directly driven in rotation by a motor. Rather, the only cause of rotation of the wheel, and therefore of the generator, comes from the trailer being pulled over a road.

The trailer may further comprise a refrigeration system, wherein the generator system is connected to the refrigeration system and is arranged to selectively provide electrical power to the refrigeration system, under command of the processor.

The refrigeration system may therefore be powered by the generator, and this may reduce or eliminate the need for electrical power provided by the tractor. Alternatively or additionally, the refrigeration system may be powered by the battery and/or by a grid power supply.

The trailer may further comprise a communication link connected to the processor, wherein the processor is configured to provide information via the communication link regarding at least one of: the connection state of the electrically actuated clutch and the electrical output of the generator.

The communication link may provide information to a tractor computer or other screen. The communication link may provide information concerning one or more of: the electrical output of the generator, whether the generator is in a locked state, whether an overspeed state is occurring, whether a refrigeration system is powered on, etc.

According to a further aspect, there is provided a method of controlling a generator system, wherein a rotor of a generator of the generator system is arranged to be selectively connected to a vehicle axle via an electrically-actuated clutch such that, when the rotor is connected to the axle via the clutch, rotation of the vehicle axle drives the rotor to rotate within the generator. The method comprises: monitoring, using a processor, an electrical output of the generator; and disconnecting the rotor from the axle when the electrical output is outside a predetermined range.

This method may protect the generator, e.g. from excessive wear when it is not required to generate power.

The predetermined range may be an electrical frequency range of from 0 Hz to 500 Hz; and/or the predetermined range may be an electrical voltage range of from 0 volts to 600 volts; and/or the predetermined range may be an electrical current range of from 0 amps to 32 amps. Alternatively, the minimum of each respective predetermined range may be 10 Hz or 10 V or 1 A.

The method may comprise: monitoring, using a sensor, a rotational speed of the vehicle axle; converting, using the processor, the rotational speed of the axle into an expected electrical output generated by the generator; determining, by the processor, a locked-state of the rotor when the monitored electrical output differs from the expected electrical output by more than a predetermined amount; and using the clutch, disconnecting the rotor from the axle in response to determining a locked-state of the rotor.

This may help protect a vehicle against unintended braking of the wheel(s) when the rotor is jammed (locked) within the generator. The predetermined amount allows for measurement errors in one or both of the sensed rotational speed and the detected electrical output of the generator. This helps avoid disconnecting the generator unnecessarily when everything is operating normally but a measurement error indicates a small discrepancy between the expected frequency and the detected frequency.

The method may comprise disconnecting the rotor from the axle if the rotational speed of the axle is above a predetermined rotational speed.

This may protect the generator from being driven too fast, beyond its design parameters. This may also avoid letting the generator output too much power which could damage electronic components that are powered using the generator.

The method may comprise monitoring, using the processor, a charge level of a battery that is selectively electrically connected to the electrical output of the generator, and charging the battery using the electrical output of the generator, when the electrical output is above a predetermined threshold and when the charge level is below a predetermined threshold.

In this manner, the battery may be (re)charged when its charge gets too low, but can avoid overcharging the battery which can reduce battery lifetime or its ability to hold charge.

BRIEF DESCRIPTION OF THE DRAWINGS

Certain embodiments of the present disclosure will now be described in greater detail by way of example only and with reference to the accompanying drawings in which.

DETAILED DESCRIPTION OF THE INVENTION

Figure 1:
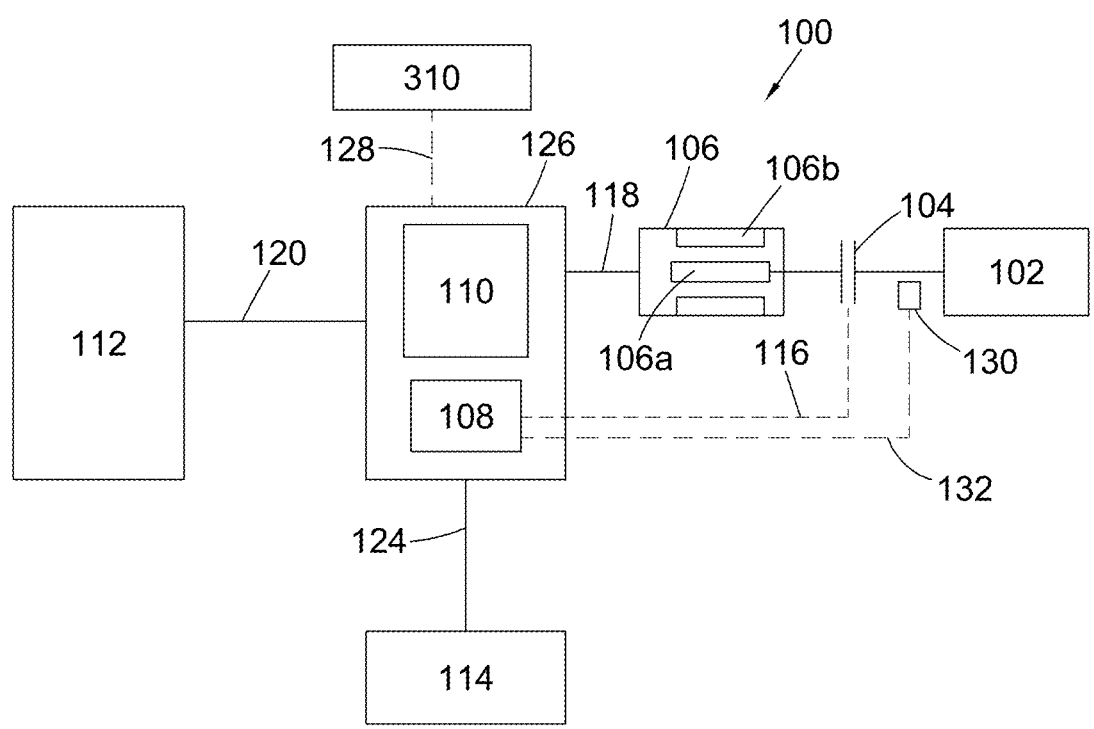
FIG. 1 shows a schematic drawing of system having an axle generator selectively connected for rotation to a vehicle axle.

FIG. 1 shows a generator system 100 for generating electrical power from the rotation of a vehicle axle 102. The generator system 100 comprises at least a generator 106, an electrically-actuated clutch 104, and a processor 108 configured to monitor an electrical output of the generator 106.

The generator 106 is selectively connected to the axle 102 via the electrically-actuated clutch 104. The generator 106 comprises a rotor 106*a* and a stator 106*b*. The clutch 104 has an engaged position in which rotation of the axle 102 is transmitted to the rotor 106*a*, to turn the rotor 106*a* relative to the stator 106*b*. The clutch 104 also has a disengaged position in which rotation of the axle 102 is not transmitted to the rotor 106*a*.

The generator 106 is electrically connected via an electrical line 118 to a control unit 126. The control unit 126 houses the processor 108 and a battery 110. The control unit 126 is electrically and communicatively connected to a refrigeration unit 112 and is configured to selectively provide electrical power to the refrigeration unit 112. The connection between the refrigeration unit 112 and the control unit 126 may be via one or more electrical lines 120.

The control unit 126 may also selectively connect to a grid power supply 114 via an electrical line 124. The battery 110 may be charged from the grid power supply 114 when the control unit 126 is connected to the grid power supply 114.

The battery 110 may be charged by electrical power from the generator 106, e.g. when a battery charge level is below a predetermined level. The battery 110 provides electrical power to the processor 108. This allows the processor 108 to function even when the generator 106 is not producing electrical power.

Figure 2:
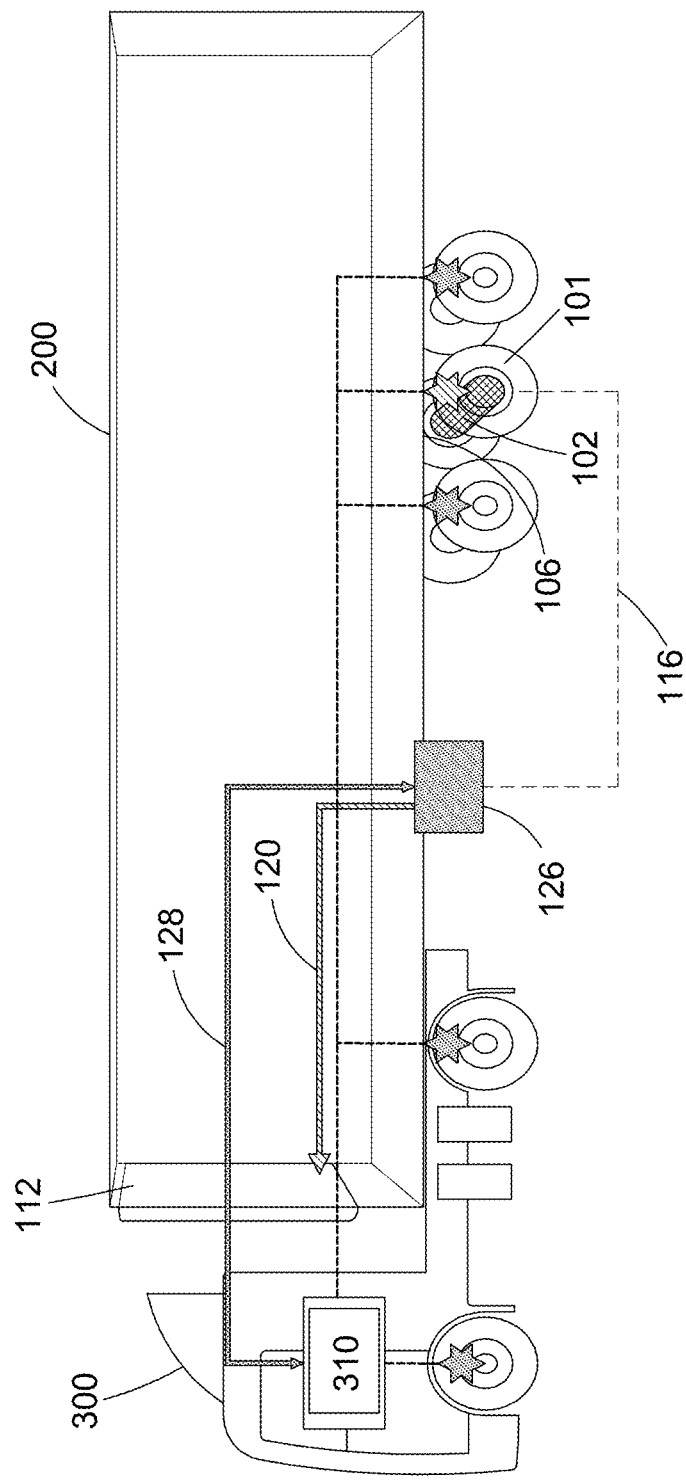
FIG. 2 shows a trailer and tractor incorporating the axle generator.

As shown in FIG. 2, the vehicle axle 102 may be an axle of a trailer 200. Trailers 200 are commonly used to transport goods and are pulled by a tractor 300 (also sometimes referred to as a truck). A given trailer 200 may be readily connected to and disconnected from different tractors 300. The tractor 300 provides the motive power to pull the trailer 200, and the trailer 200 typically has no engine or other means for turning its wheels. Instead, the trailer 200 relies entirely on tractors (e.g. tractor 300) to move the trailer 200 from place to place.

The trailer 200 in FIG. 2 is a refrigerated trailer and has the refrigeration system 112. The refrigeration system 112 is arranged to provide temperature control to the interior of the trailer, in order to keep goods stored therein at a predetermined temperature or within a predetermined temperature range. Operation of the refrigeration system 112 may be controlled, at least in part, by the processor 108 of the control unit 126.

The control unit 126 is mounted to the trailer 200 and the generator 106 is mounted to or adjacent to the axle 102. A communication link 128 is provided to communicatively connect the control unit 126 with a computer 310 on the tractor 300. The computer 310 may provide information to a driver in the tractor 300, e.g. to provide information on any of: the operation and/or performance of the refrigeration system 112, the operation and/or performance of the generator 106, the charge level of the battery 110, and the position of the clutch 104 (i.e. engaged position vs disengaged position).

The communication link may 128 be a wired link or a wireless link.

When the trailer 200 is in motion on a road, e.g. due to being pulled by the tractor 300, the wheels 101 of the trailer 200 are turned by friction with the road surface. One pair of the wheels 101 is connected to the axle 102 to which the generator 106 is selectively connected, via the clutch 104. Thus, when the trailer 200 is in motion, the axle 102 rotates. This rotational motion may be transmitted to the generator 106, via the clutch 104, to generate electrical power from the rotational motion.

As mentioned above, the trailer 200 does not have its own engine. As such, neither the axle 102 nor the generator 106 are directly driven by an engine of the tractor 300. Rather, the axle 102 is a free-wheeling axle that is turned by friction with a surface (e.g. road) over which the trailer 200 is being pulled by the tractor 300. This axle 102 is therefore distinct from a driven axle of a vehicle that is mechanically connected to an engine such that rotation of an output shaft of the engine directly results in rotation of the wheels (i.e. regardless of any contact with a road).

Figure 3:
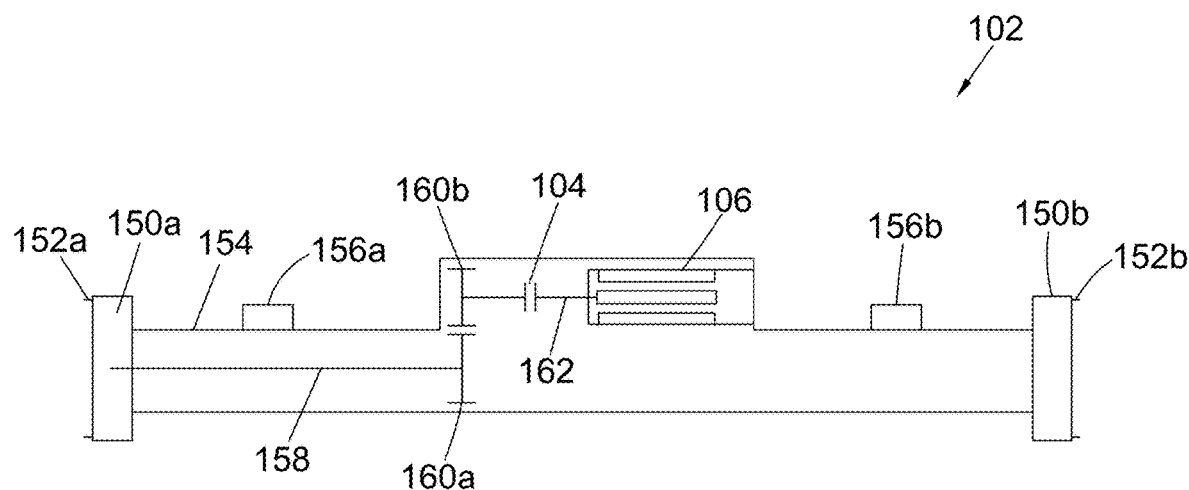
FIG. 3 shows a vehicle axle having the axle generator mounted thereon.

FIG. 3 shows a schematic view of an exemplary axle 102 having the generator 106 mounted thereto.

The axle 102 has rotational end parts 150*a*,150*b* each for connecting to a wheel (e.g. wheel 101 shown in FIG. 2) via connectors 152*a*,152*b*, respectively. The rotational end parts 150*a,b* are rotatable relative to a main axle shaft 154 that is connected to the trailer 200 via connection points 156*a*, 156*b*. The main axle shaft 154 has a hollow interior and does not rotate relative to the trailer 200 when the trailer is in motion. A torque shaft 158 is connected at a first end to one of the rotational end parts 150*a* and extends within the hollow interior. The torque shaft 158 rotates along with rotation of the rotational end part 150*a*. A first gear 160*a* is attached to the torque shaft at or near a second end of the torque shaft 158. The first gear 160*a* connects to a second gear 160*b* and the second gear 160*b* connects to a first side of the electrically-actuated clutch 104. A generator shaft 162 extends from a second side of the electrically actuated clutch 104 and connects to the rotor 106*a* of the generator 106. The first and second gears 106*a,b* may be selected to provide a fixed gear ratio as desired.

One or more bearings (not shown) may be provided to support some or all of the torque shaft 158, generator shaft 162 and/or gears 160*a,b* within the main axle shaft 154.

The generator 106 is fixed to the main axle shaft 154. However, other arrangements are envisaged, such as connecting the generator to the trailer 200 rather than to the main axle shaft 154.

With this arrangement, when the trailer 200 is pulled along a road by a tractor 300, friction between the road and the wheel 101 causes the wheel 101 of the trailer 200 to rotate. With reference to FIGS. 2 and 3, rotation of the wheel 101 causes rotation of the rotational end part 150*a* of the axle, which in turn causes rotation of the torque shaft 158 and the gears 160*a,b*. If the clutch 104 is in the engaged position, rotation of the second gear 160*b* causes rotation of the generator shaft 162, which turns the rotor 106*a* within the generator 106. If the clutch 104 is in the disengaged position, the second gear 160*b* spins freely and rotation of this gear is not passed to the generator 106.

The sensor 130, if present, may be located at any point from the wheel 101 up to the first side of the clutch 104.

Returning now to FIG. 1, the processor 108 monitors an electrical output of the generator 106. The term "electrical output" encompasses any one or more of electrical voltage, electrical frequency, and electrical current. That is, the processor 108 monitors: an output voltage from the generator, an output current from the generator, and/or an output electrical frequency from the generator.

The processor 108 also controls the electrically-actuated clutch 104 and may command the clutch 104 to actuate between the engaged and disengaged positions. The processor 108 is connected to the electrically-actuated clutch via a communication line 116. This actuation of the clutch 104 may be accomplished using power from the battery 110. As such, the clutch 104 may be moved between the engaged and disengaged positions even if the generator 106 is not currently producing electrical power or is producing an insufficient amount of electrical power. Alternatively, actuation of the clutch 104 may be performed using power from a grid power source 114.

The processor 108 is configured to command the clutch 104 to move to the disengaged position if the electrical output moves outside a predetermined range. Examples of suitable predetermined ranges are disclosed below. Also discussed are specific situations that may lead to the electrical output moving outside the predetermined range.

The predetermined range may in some cases be multiple predetermined ranges, each predetermined range for a different electrical characteristic. For example, the processor 108 may monitor both electrical frequency and electrical voltage from the generator 106, and may be configured to command the clutch 104 to move to the disengaged position if either the electrical voltage moves outside the predetermined range for voltage or if the electrical frequency moves outside the predetermined range for frequency.

A suitable predetermined range for electrical frequency may be, for example, 0 Hz to 500 Hz, and optionally 10 Hz to 500 Hz.

A suitable predetermined range for electrical voltage may be, for example, 0 V to 600 V, and optionally may be 0 V to 450 V, and optionally 10 V to 450 V.

A suitable predetermined range for electrical current may be, for example, from 0 A to 32 A, and optionally may be 5 A to 32A.

In some situations, the refrigeration system 112 is not required. For example, the trailer 200 may be being used to transport goods that do not require a temperature controlled environment, and thus the refrigeration system 112 may be turned off. In this case, the processor 108 may command the clutch 104 to move to the disengaged position so that the rotor 106a is not turned within the generator 106. This may reduce wear on the generator 106 and extend its service life.

The refrigeration system 112 may require specific characteristics of received electrical power in order to function correctly, e.g. it may require specific voltage, electrical frequency, and/or electrical current. Similarly, the battery 110 may require specific characteristics of received power in order to recharge properly.

In some situations, the electrical output of the generator 106 may not be suitable for recharging the battery 110 and/or powering the refrigeration system 112. For example, at low trailer 200 speeds, the generator 106 could produce electricity but this may have too low a frequency to meet the requirements of the refrigeration system 112 and/or battery 108. In this case, the processor 108 may command the clutch 104 to move to the disengaged position so that the rotor 106a is not turned within the generator 106.

The control unit 126 may contain power conversion electronics to convert the output from the generator 106 to electrical power having different characteristics. For example, the control unit may have power control electronics suitable for increasing or decreasing the voltage received from the generator, and/or for converting an A.C. output from the generator to D.C. power etc. However, the power control electronics may nonetheless require the power received from the generator 106 to have certain minimum or maximum characteristics (e.g. a minimum voltage, a maximum voltage, a minimum frequency, a maximum frequency, a minimum current, and/or a maximum current) in order to successfully produce output power that had the characteristics required by the refrigeration system 112 and/or battery 110. If the electrical output is outside this range, i.e. such that the power conversion electronics cannot convert the electrical output to a suitable electrical supply for the refrigeration system 112 and/or battery 110, then the processor 108 may command the clutch 104 to move to the disengaged position so that the rotor 106a is not turned within the generator 106. This may occur, for example, if the trailer 200 is moving too slowly such that insufficient power is generated by the generator 106. The battery 110 may be used to power the refrigeration system 112 instead, if required. Once the electrical output is within the predetermined range (e.g. if the trailer 200 speeds up), the processor 108 may command the clutch 104 to move to the engaged position so that the rotor 106a turns within the generator 106 and the generator 106 generates electrical power, e.g. for provision to the refrigeration system 112 and/or to recharge the battery 110. A similar situation may prevail if the trailer 200 is moving too fast, such that e.g. an electrical frequency of the power generated by the generator 106 is too high, i.e. above the predetermined range.

In this situation, the predetermined range for the electrical output of the generator 106 may be one of: a minimum and maximum voltage, a minimum and maximum frequency, and a minimum and maximum current. Specific values for these minima and maxima will depend upon the specific requirements of the refrigeration system 106, and/or battery 108, and/or power conversion electronics.

One known type of malfunction of a generator (e.g. generator 106) is the rotor locking within the generator 106. Rotor locking may be caused, for example, by debris, failure of bearings in the generator 106, or thermal expansion/contraction of parts of the generator 106. In this situation, if the generator 106 is connected to the axle 102, the generator 106 will act as a brake on the axle 102. This unintentional braking of the axle 102 can be a safety risk, as it could cause the trailer 200 to slip on the road, or lead to loss of control of the trailer 200 and tractor 300, which may lead to an accident.

A sensor 130 may be arranged to sense a rotational speed and/or rotational frequency of the axle 102, e.g. as shown in FIG. 1. Data from the sensor 130 is communicated, via a communication link 132, to the processor 108. The processor 108 may convert the rotational speed or frequency of the axle 102 into an expected electrical output of the generator 106. The conversion of the rotational speed of the axle 102 to an expected electrical output will depend upon several factors, including: the arrangement of the generator, particularly the number of poles in the generator 106, as well as any gears (e.g. gears 160a,b) between the wheel 101 and the rotor 106a.

If the electrical frequency output by the generator 106 deviates from the expected electrical output by more than a predetermined amount, this may indicate that the rotor 106a is stuck within the generator 106. The predetermined amount is to allow for measurement error in either or both of: the electrical output of the generator 106 and the rotational speed measured by the sensor 130. The predetermined amount may be, for example, +/−5 Hz.

In a similar manner, an expected voltage output or an expected current output may be calculated. The expected voltage output or expected current output may be compared to the electrical output of the generator 106 monitored by the processor and, if the monitored output deviates from the expected output by more than a predetermined amount, this may indicate the rotor 106a is stuck within the generator 106. The predetermined amount may be, for example, +/−5V or +/−1 A, as appropriate.

In this scenario, the processor 108 may determine a locked-state of the rotor 106a and command the clutch 104 to move to the disengaged position so that the generator 106 does not brake the axle 102.

By way of example only, if the sensor 130 detects the axle 102 is rotating at 10 Hz (600 rpm—which might typically correspond to a vehicle speed of 60 km per hour), and the generator is a three pole generator then the processor 108 would calculate an expected electrical output frequency of 30 Hz. If the processor detects an electrical output frequency of 28 Hz, then it may determine that the generator 106 is operating normally, within measurement error. However, if the processor detects an electrical output frequency of 20 Hz, this may indicate that the rotor 106a is partially sticking within the generator 106 and this sticking will be providing a unintended braking force on the axle 102. In this case, the processor 108 may command the clutch 104 to move to the disengaged position so that the generator 106 does not brake the axle 102.

If the rotational speed measured by the sensor 130 exceeds a predetermined maximum speed, the processor may determine an overspeed state. That is, the trailer 200 may be moving faster along a road than may be safely accommodated by the generator 106. In this case, the processor 108 may command the clutch 104 to move to the disengaged position so that the generator 106 is not run faster than its design parameters. The predetermined maximum speed may alternatively be set based on requirements of the refrigerating system 112, battery 108, and/or power conversion electronics.

In a situation where the battery 110 charge is low, the processor may detect this low charge and command the clutch 104 to move to the engaged position so that the generator 106 provides power and this power is used to charge the battery 110. This may occur, for example, even if the generator 106 is not otherwise required at present, e.g. not required to power the refrigeration system 112.

In this situation, the processor may also be configured to control the clutch 104 to move to the disengaged position in response to determining that the battery charge level is above a predetermined level.

Figure 4:
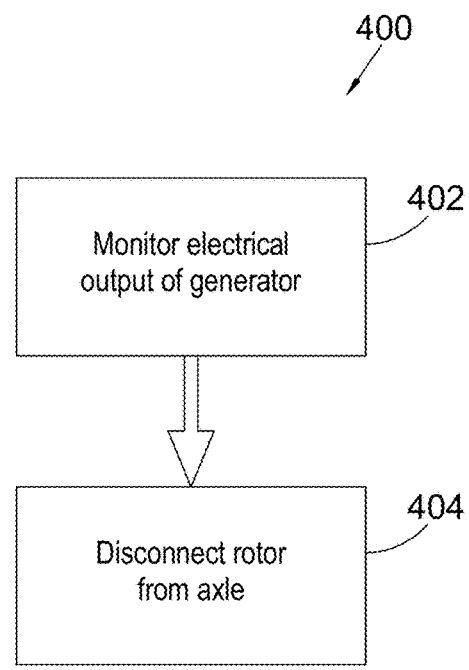
FIG. 4 shows a method of monitoring a generator system.

FIG. 4 discloses a method 400 of controlling the generator system 100. Method step 402 involves monitoring an electrical output of the generator 106, using the processor 108. Method step 404 involves disconnecting the rotor 106a from the axle 102 when the electrical output is outside a predetermined range.

What is claimed is:

1. A generator system for connection to a vehicle axle; the generator system comprising:
an electrically-actuated clutch having an engaged position and a disengaged position;
a generator comprising:
a rotor configured to be selectively connected, via the clutch, to the vehicle axle; and
a stator;
wherein, in the engaged position, the rotor is connected to the vehicle axle via the clutch such that torque from rotation of the vehicle axle is transmitted to the rotor, and
wherein, in the disengaged position, torque from rotation of the vehicle axle is not transmitted to the rotor; and
a processor configured to control the clutch to actuate between the engaged and disengaged positions;
wherein the processor is configured to monitor an electrical output of the generator, and wherein the processor is configured to command the clutch to move to the disengaged position such that torque from the rotation of the vehicle axle is not transmitted to the rotor of the generator if the electrical output moves outside a predetermined range.

2. The generator system of claim 1, wherein the predetermined range is an electrical frequency range of from 0 Hz to 500 Hz; and/or wherein the predetermined range is an electrical voltage range of from 0 volts to 600 volts; and/or wherein the predetermined range is an electrical current range of from 0 amps to 32 amps.

3. The generator system of claim 1, further comprising a sensor for detecting a rotational speed or frequency of the vehicle axle; wherein the sensor is connected to the processor, and wherein the processor is configured to:
convert the detected rotational speed or frequency of the vehicle axle into an expected electrical output generated by the generator;
determine a locked-state of the rotor if the monitored electrical output differs from the expected electrical output by more than a predetermined amount; and
control the clutch to move to the disengaged position in response to determining the locked-state of the rotor.

4. The generator system of claim 3, wherein the processor is further configured to:
determine an overspeed state if the detected rotational speed or frequency of the vehicle axle is above a predetermined speed or frequency; and
control the clutch to move to the disengaged position in response to determining the overspeed state.

5. The generator system of claim 1, further comprising a battery, wherein the battery is configured to supply electrical power to the electrically-actuated clutch and to the processor; and wherein the generator is configured to selectively provide power to the battery to charge the battery.

6. The generator system of claim 5, wherein the processor is configured to detect a battery charge level and to control the clutch to move to the disengaged position in response to determining that the battery charge level is above a predetermined level.

7. A method of controlling a generator system, the generator system comprising: an electrically-actuated clutch having an engaged position and a disengaged position; a generator comprising: a rotor configured to be selectively connected, via the clutch, to the vehicle axle; and a stator; wherein, in the engaged position, the rotor is connected to the vehicle axle via the clutch such that torque from rotation of the vehicle axle is transmitted to the rotor, and wherein, in the disengaged position, torque from rotation of the vehicle axle is not transmitted to the rotor; and a processor configured to control the clutch to actuate between the engaged and disengaged positions; the method comprising:

monitoring, using the processor, an electrical output of the generator; and disconnecting, using the clutch, the rotor from the vehicle axle such that torque from the rotation of the vehicle axle is not transmitted to the rotor of the generator when the electrical output is outside a predetermined range.

8. The method according to claim 7, the predetermined range is an electrical frequency range of from 0 Hz to 500 Hz; and/or wherein the predetermined range is an electrical voltage range of from 0 volts to 600 volts; and/or wherein the predetermined range is an electrical current range of from 0 amps to 32 amps.

9. The method according to claim 7, comprising monitoring, using a sensor, a rotational speed of the vehicle axle;

converting, using the processor, the rotational speed of the vehicle axle into an expected electrical output generated by the generator;

determining, by the processor, a locked-state of the rotor when the monitored electrical output differs from the expected electrical output by more than a predetermined amount; and using the clutch, disconnecting the rotor from the vehicle axle in response to determining the locked-state of the rotor.

10. The method according to claim 9, comprising disconnecting the rotor from the vehicle axle if the rotational speed of the vehicle axle is above a predetermined rotational speed.

11. The method according to claim 7, comprising monitoring, using the processor, a charge level of a battery that is selectively electrically connected to the electrical output of the generator, and charging the battery using the electrical output of the generator, when the electrical output is above a predetermined threshold and when the charge level is below the predetermined threshold.

12. A trailer comprising:

a wheel;

a vehicle axle connected to the wheel, wherein the vehicle axle is arranged to be driven in rotation by relative motion between the trailer and a surface the trailer is on; and a generator system for connection to the vehicle axle, the generator system comprising:

an electrically-actuated clutch having an engaged position and a disengaged position;

a generator comprising:

a rotor selectively connected, via the clutch, to the vehicle axle; and a stator;

wherein, in the engaged position, the rotor is connected to the vehicle axle via the clutch such that torque from rotation of the vehicle axle is transmitted to the rotor, and wherein, in the disengaged position, torque from rotation of the vehicle axle is not transmitted to the rotor; and a processor configured to control the clutch to actuate between the engaged and disengaged positions, wherein the processor is configured to monitor an electrical output of the generator, and wherein the processor is configured to command the clutch to move to the disengaged position such that torque from the rotation of the vehicle axle is not transmitted to the rotor of the generator if the electrical output moves outside a predetermined range.

13. The trailer of claim 12, wherein the trailer does not have an engine arranged to drive the vehicle axle.

14. The trailer of claim 12, further comprising a refrigeration system, wherein the generator system is connected to the refrigeration system and is arranged to selectively provide electrical power to the refrigeration system, under command of the processor.

15. The trailer of claim 12, further comprising a communication link connected to the processor, wherein the processor is configured to provide information via the communication link regarding at least one of: a connection state of the electrically actuated clutch and the electrical output of the generator.

* * * * *